United States Patent [19]
Hong

[11] 3,818,436
[45] June 18, 1974

[54] ELECTRICAL ANTI-THEFT SYSTEM
[76] Inventor: Young C. Hong, 42-52 Union St., Flushing, N.Y. 11355
[22] Filed: May 30, 1973
[21] Appl. No.: 365,260

[52] U.S. Cl.............. 340/64, 317/134, 307/10 AT, 200/42 R, 180/114
[51] Int. Cl............................................. B60r 25/00
[58] Field of Search ........ 340/63, 64; 200/42 R, 43, 200/44, 45; 307/10 AT; 180/114; 317/134

[56] References Cited
UNITED STATES PATENTS
3,611,287  10/1971  Hoff...................................... 340/63
3,754,148  8/1973  Nye................................ 307/10 AT Primary Examiner—Alvin H. Waring
Attorney, Agent, or Firm—Howard I. Podell

[57] ABSTRACT

An electrical anti-theft system comprising a circuit of electrical relays, and momentary contact pushbuttons which are connected in such a manner as to apply the theories of mathematical combination and probability to an anti-theft mechanism by means of an electric circuit.

2 Claims, 4 Drawing Figures

PATENTED JUN 18 1974   3,818,436

ELECTRICAL ANTI-THEFT SYSTEM

SUMMARY OF THE INVENTION

This invention relates to an electrical anti-theft system and particularly to one in which an electrical circuit may not be activated unless the correct combination of a group of pushbuttons are pushed in the correct sequence. The electric circuit which is controlled may be used in any number of manner or means to operate an anti-theft locking mechanism.

An advantage of this invention is that using only a total of 20 pushbuttons the chance to hit the right pushbuttons in the right sequence is only one in 17,955.

In addition, as compared with conventional locking mechanisms, this system, even if destroyed, will remain locked.

A further advantage of the invention is that it is simply made and can be mass produced with a connection means for adaptation to the ignition system of a motor vehicle. The selection of the numbered pushbuttons and sequences may be easily changed by an experienced mechanic.

The device consists of a pushbutton panel containing the desired number of pushbuttons and complete electrical circuit including the relays and contacts. A waterproof cover could be included for use in convertible automobiles.

BRIEF DESCRIPTION OF THE DRAWINGS

The objects and features of the invention may be understood with reference to the following detailed description of an illustrative embodiment of the invention, taken together with the accompanying drawings in which.

Figure 4:
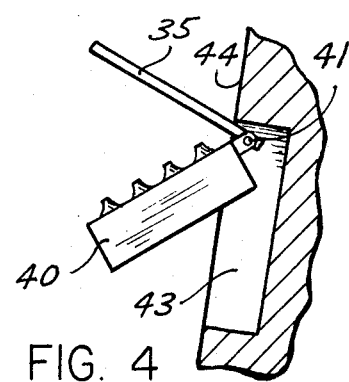
FIG. 4 is a sectional view of the pushbutton panel as installed in an automobile with the optional cover.

DESCRIPTION OF THE PREFERRED EMBODIMENT:

Turning now descriptively to the drawings, in which similar reference characters denote similar elements through the several views, FIG. 4 illustrates the device housed in a panel box 40 which may be mounted in a cavity 43 in the exterior body 44 of an automobile so that the electrical blocking mechanism activates electrically controlled door locks.

A waterproof cover 35 is mounted to hinge pin 41 and both cover 35 and panel box 40 are pivotably mounted to hinge pin 41. Alternately, panel box 40 may be mounted inside of the automobile to the dashboard of the car. In the preferred embodiment, one panel box 40 is externally mounted as shown in FIG. 4, to the exterior of the automobile and a second panel box 40 may be mounted inside the vehicle to the dashboard, with the exterior panel box controlling the electric door switches and the interior panel boxes controlling the ignition or other anti-theft circuits.

A series of pushbutton momentary normally open contact switches numbered 1 through 20 inclusive are mounted on the exterior surface of the panel box 40 so that the user may press any of the switch pushbuttons simultaneously or in sequence as desired with the proper sequence serving to activate the circuit and with the lock circuit disabled if an incorrect pushbutton is pressed.

Figure 2:
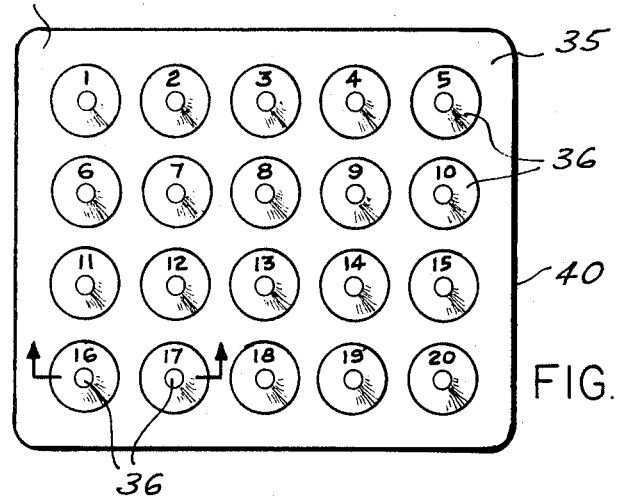
FIG. 2 is a plan view of the pushbutton panel face.
Figure 3:
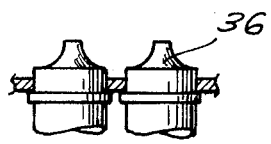
FIG. 3 is a partial sectional view of the pushbuttons.

As shown in FIGS. 2 and 3, the pushbutton 36 of each pushbutton switch extends above the surface 21 of the panel box 40, with each pushbutton operator 36 being identified by an individual number or letter marking.

Figure 1:
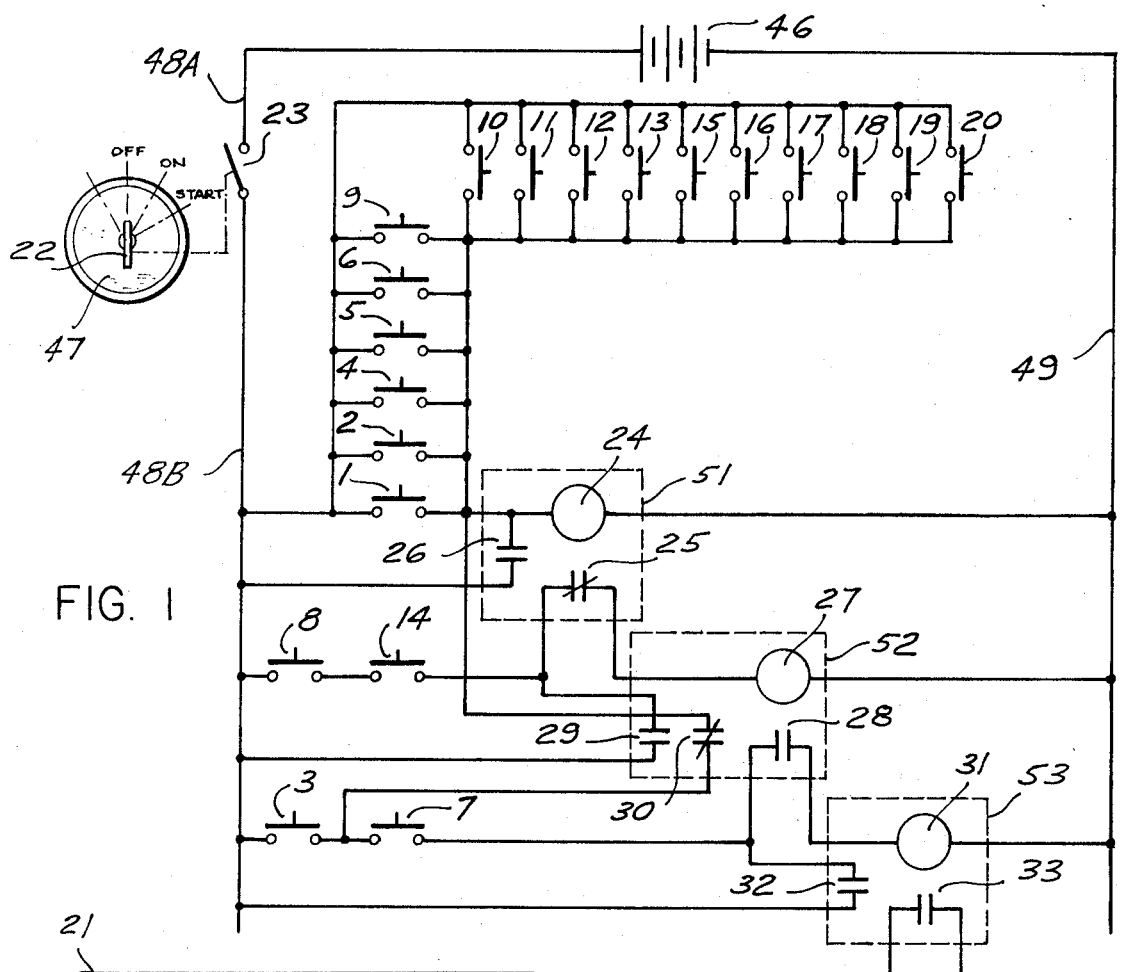
FIG. 1 is a complete schematic wiring diagram of the device ready for use.

The schematic diagram shown in FIG. 1 illustrates the circuit of the device as used to control the ignition and starting circuits of an attached automobile, but it will be apparent to one skilled in the art, how a similar circuit could be utilized for controlling electrical door locks if the device were mounted on the exterior of the car as shown in FIG. 4.

As shown in FIG. 1, a power line 48A from automobile battery 46 is connected in series with the key accessory and ignition switch 47 of the automobile to energize the circuitry. Key switch 47 is a conventional automobile electrical switch which is operated by the rotation of the key 22 turning initially the accessory and ignition switch 23 of ignition control 47 to the on position and with further rotation in the same direction of the key turning a second switch, not shown, to connect the starter motor of the vehicle.

Sixteen of the pushbutton switches of the device, specifically numbered switches 1, 2, 4–6, 9–13, and 15–20, inclusive are connected in parallel. This assembly of switches is located in series with the coil 24 of relay 51 and with the power lines 48B and 49 of the circuit, so that energizing any one of said parallel joined switches energizes relay 51. Two of the contacts of the switches 8 and 14, are joined in series, with each other, and with the coil 27 of relay 52 normally closed contacts 25 of relay 51 and the power lines 48B and 49. The remaining two switches 3 and 7 are joined in series together and joined in series with the coil 31 of relay 53 normally open contact of relay 52 and the power lines 48 and 49.

Turning of ignition key 22 from the off position to either the on position, or further to the start position, maintains switch 23 in the on position so as to feed electricity from the battery 46 to power lines 48B and 49. The sixteen pushbutton switches in parallel are also connected in parallel to a relay contact 26 of relay 51 so that if any one of the sixteen pushbutton switches is energized momentarily, relay 51 is turned on and the normally open contact 26 of relay 51 maintains relay 51 in the on position until the ignition key 22 is turned to the off position disabling the entire circuit.

Normally closed contact 25 of relay 51 is connected in series with pushbutton switches 8 and 14 and with the coil 27 of relay 52 so that when relay 51 is energized, relay 52 cannot be energized.

Normally open contact 28 of relay 52 is joined in series with the coil 31 of relay 53 and the series circuit of pushbutton switches 3 and 7 so that relay 53 can only be energized if relay 52 is energized. Normally open contact 33 of relay 53 may be set in series with the automobile ignition circuit, or the automobile starter motor circuit, or with any other circuit which must be energized in order to start or maintain the automobile engine in an operating condition.

A circuit to further insure the proper sequencing of the pushbutton switches connects pushbutton switch 3 in series with the normally closed contact 30 of relay 52 and coil 24 of relay 51 so that if pushbutton switch 3 is operated prior to energization of relay 52, relay 51 will be energized to disable the circuit. Normally open contacts 29 of relay 52 are located in parallel with the series circuit of pushbutton switch 8 and 14 so that once pushbuttons 8 and 14 have been both depressed and relay 52 has been energized, normally open contacts 29 maintain relay 52 in the on condition permitting removal of finger pressure from pushbuttons 8 and 14. Similarly, normally open contact 32 of relay 53 is in joined parallel with the series combination of pushbutton switches 3 and 7.

It is to be noted that the selection of the pushbutton switches which are joined in parallel sequence and the switches which have been selected to control the relay 52 and the relay 53 is a purely arbitrary choice and one that is only known to the proper operator of the vehicle. Pressing of any one of the pushbuttons of the 16 switch assembly joined in parallel prevents relay 53 from being energized and will maintain normally opened contacts 33 in the open mode preventing activation of the engine until ignition switch 22 is turned to the off position.

In use, the operator turns the switch key 22 to the on position and first depresses pushbutton switches 8 and 14. Relay 52 is energized and the operator then presses pushbutton switches 3 and 7 which energizes relay 31 and closes normally open contacts 33 to turn the antitheft circuit 34 to the on position permitting starting of the automobile. Energizing any other sequence of pushbutton switches disables the circuit until the ignition key is turned to the off position.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An electrical anti-theft system in which a necessary protected electrical circuit is controlled by relay contacts which turn the protected circuit to the on position only if selected pairs of momentary contact electrical switches are energized in the proper sequence and prevents the protected circuit from being supplied with electricity if other available momentary contact switches are turned on during the unlocking operation, comprising, a panel board on which a multiplicity of operating arms of individual momentary contact switches are mounted, with each switch being identified individually and with the majority of said switches being connected in parallel to each other, said parallel assembly of switches being connected in series with the coil of a first relay, said circuit being in series with a source of power and with a master control switch such that once the master control switch has been turned on, the momentary activation of any one of said switches of the parallel assembly will turn said first relay to the on position, said first relay being fitted with a normally open switch joined in parallel with said bank of switches to maintain said relay in the on position once it has been turned on, and said first relay being fitted with a normally closed contact which is located in series with the coil of a second relay so that said second relay cannot be turned on while said first relay is in the energized mode, with the said protected circuit connected in series with a normally open contact of said second relay so that the said protected circuit cannot be operated unless said second relay is in on condition, the coil of said second relay being connected in series with the aforesaid normally closed contacts of the first relay and in series with each of two of the momentary switches mounted on the panel board, such that momentary operation of both of said two series-connected switches is required to turn the second relay on, with the first relay remaining in the off position in order to switch on the protected circuit.

2. The combination as recited in claim 1 in which the protected electric circuit incorporates a third relay with the coil of the third relay being in series with a normally open contact of the second relay and with each of two additional momentary contact switches.

* * * * *